(12) United States Patent
Schweitzer, III et al.

(10) Patent No.: US 10,951,057 B1
(45) Date of Patent: Mar. 16, 2021

(54) RELIABLE POWER MODULE FOR IMPROVED SUBSTATION DEVICE AVAILABILITY

(71) Applicant: Schweitzer Engineering Laboratories, Inc., Pullman, WA (US)

(72) Inventors: Edmund O. Schweitzer, III, Pullman, WA (US); David E. Whitehead, Pullman, WA (US); Tony J. Lee, Henderson, NV (US); David J. Casebolt, Moscow, ID (US); Krishnanjan Gubba Ravikumar, Pullman, WA (US); Austin Edward Wade, Moscow, ID (US); Bruce A. Hall, Pullman, WA (US); Kelsey M. Loughlin, Colfax, WA (US); Sean D. Robertson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/796,567

(22) Filed: Feb. 20, 2020

Related U.S. Application Data

(60) Provisional application No. 62/914,501, filed on Oct. 13, 2019.

(51) Int. Cl.
| | |
|---|---|
| *H02H 3/00* | (2006.01) |
| *H02J 9/06* | (2006.01) |
| *H02H 3/20* | (2006.01) |
| *H02H 1/06* | (2006.01) |

(52) U.S. Cl.
CPC ............ *H02J 9/061* (2013.01); *H02H 1/06* (2013.01); *H02H 3/202* (2013.01)

(58) Field of Classification Search
None
See application file for complete search history.

(56) References Cited

U.S. PATENT DOCUMENTS

| | | |
|---|---|---|
| 2,921,238 A | 1/1960 | Wollerton |
| 6,297,972 B1 | 10/2001 | Chen |
| 6,396,279 B1 | 5/2002 | Gruenert |
| 6,504,270 B1 | 1/2003 | Matsushita |
| 6,608,493 B2 | 8/2003 | Hensler |

(Continued)

OTHER PUBLICATIONS

David Costello: Understanding and Analyzing Event Report Information, Oct. 2000.

(Continued)

*Primary Examiner* — Stephen W Jackson
(74) *Attorney, Agent, or Firm* — Richard M. Edge

(57) ABSTRACT

Disclosed herein are systems for maintaining protection of electric power delivery systems in the event of a control power failure or other anomaly. A reliable power module conditions electric power from multiple independent sources and provides electrical operational power to electric power delivery system protective loads. The reliable power module includes a power storage device for providing operational power even upon loss of all control power sources. The power storage may be sufficient to ride through expected losses such as a time to start up backup generation. The power storage may be sufficient to power a trip coil. Thus, electric power system protection is maintained even upon loss of control power.

20 Claims, 8 Drawing Sheets

(56) References Cited

U.S. PATENT DOCUMENTS

| | | |
|---|---|---|
| 6,650,560 B2 | 11/2003 | MacDonald |
| 6,657,321 B2* | 12/2003 | Sinha .................. H02J 9/08 |
| | | 307/68 |
| 6,751,109 B2 | 6/2004 | Doss |
| 6,795,789 B2 | 9/2004 | Vandiver |
| 6,847,297 B2 | 1/2005 | Lavoie |
| 6,892,115 B2 | 5/2005 | Berkcan |
| 6,892,145 B2 | 5/2005 | Topka |
| 6,909,942 B2 | 6/2005 | Andarawis |
| 6,985,784 B2 | 1/2006 | Vandevanter |
| 6,999,291 B2 | 2/2006 | Andarawis |
| 7,012,421 B2 | 3/2006 | Lavoie |
| 7,043,340 B2 | 5/2006 | Papallo |
| 7,058,481 B2 | 6/2006 | Jiang |
| 7,058,482 B2 | 6/2006 | Fletcher |
| 7,068,483 B2 | 6/2006 | Papallo |
| 7,068,612 B2 | 6/2006 | Berkcan |
| 7,111,195 B2 | 9/2006 | Berkcan |
| 7,117,105 B2 | 10/2006 | Premerlani |
| 7,151,329 B2 | 12/2006 | Andarawis |
| 7,254,001 B2 | 8/2007 | Papallo |
| 7,259,565 B2 | 8/2007 | Diercks |
| 7,262,943 B2 | 8/2007 | Stellato |
| 7,301,738 B2 | 11/2007 | Pearlman |
| 7,460,590 B2 | 12/2008 | Lee |
| 7,532,955 B2 | 5/2009 | Dougherty |
| 7,636,616 B2 | 12/2009 | Fletcher |
| 7,638,902 B2 | 12/2009 | Hwang |
| 7,693,607 B2 | 4/2010 | Kasztenny |
| 7,747,354 B2 | 6/2010 | Papallo |
| 7,747,356 B2 | 6/2010 | Andarawis |
| 7,986,503 B2 | 7/2011 | Papallo |
| 8,024,494 B2 | 10/2011 | Soed |
| 8,213,144 B2 | 7/2012 | Papallo |
| 8,560,255 B2 | 10/2013 | Elwarry |
| 8,891,963 B2 | 11/2014 | Patel |
| 8,963,371 B2 | 2/2015 | Kinnard |
| 9,299,524 B2* | 3/2016 | Divan .................. H01H 83/10 |
| 9,366,711 B2 | 6/2016 | Klapper |
| 9,379,579 B2 | 6/2016 | Kinnard |
| 9,632,147 B2 | 4/2017 | Hensler |
| 9,667,057 B2* | 5/2017 | Roesner ............. H02H 7/1216 |
| 9,787,134 B2* | 10/2017 | Lecourtier ............ H02J 9/061 |
| 9,819,611 B2 | 11/2017 | Snowdon |
| 10,178,047 B2 | 1/2019 | Chapman |
| 10,379,991 B2 | 8/2019 | Yang |
| 2003/0048508 A1 | 3/2003 | Yu |
| 2005/0157525 A1 | 7/2005 | Hanson |
| 2007/0267873 A1* | 11/2007 | Teichmann ........... F03D 7/0224 |
| | | 290/44 |
| 2009/0012728 A1 | 1/2009 | Spanier |
| 2009/0296583 A1 | 12/2009 | Dolezilek |
| 2010/0040068 A1 | 2/2010 | Wimmer |
| 2010/0183298 A1 | 7/2010 | Biegert |
| 2011/0148213 A1 | 6/2011 | Baldwin |
| 2016/0013632 A1 | 1/2016 | Lloyd |
| 2016/0064965 A1 | 3/2016 | White |
| 2016/0268918 A1* | 9/2016 | Wang .................... H02M 7/04 |
| 2017/0026291 A1 | 1/2017 | Smith |
| 2017/0288950 A1 | 10/2017 | Manson |
| 2018/0034689 A1 | 2/2018 | Kanabar |
| 2018/0089057 A1 | 3/2018 | Yang |
| 2018/0348267 A1 | 12/2018 | Yang |

OTHER PUBLICATIONS

Joe Perez: A Guide to Digital Fault Recording Event Analysis, 2010.
Considerations for Use of Disturbance Recorders; a Report to the System Protection Subcommittee of the Power System Relaying Committee of the IEEE Power Engineering Society, Dec. 27, 2006.
David Costello: Event Analysis Tutorial, Part 1: Problem Statements 2011.
Jane Starck, Antti Hakala-Ranta, Martin Stefanka, Switchgear Optimization Using IEC 61850-9-2 and Non-Conventional Measurements May 23, 2012.
Will Allen, Tony Lee: Flexible High-Speed Load Shedding Using a Crosspoint Switch Oct. 2005.
Qiaoyin Yang, Rhett Smith: Improve Protection Communications Network Reliability Throught Software-Defined Process Bus, Jan. 2018.
Caitlin Martin, Steven Chase, Thanh-Xuan Nguyen, Dereje Jada Hawaz, Jeff Pope, Casper Labuschagne: Bus Protection Considerations for Various Bus Types; Oct. 2013.
Michael J. Thompson, David Wilson: Auxiliary DC Control Power System Design for Substations; Mar. 2007.
Acumentrics, V2 Comliant CHS4 Ruggesd-UPS™ 1252, Apr. 2019.
PCT/US2020/053356 International Search Report and Written Opinion of the International Searching Authority dated Dec. 22, 2020.

* cited by examiner

RELIABLE POWER MODULE FOR IMPROVED SUBSTATION DEVICE AVAILABILITY

RELATED APPLICATION

This application claims priority from and benefit of U.S. Provisional Application Ser. No. 62/914,501, filed on 13 Oct. 2019, entitled "Reliable Power Module for Primary Protection Devices" which is hereby incorporated by reference in its entirety for all purposes.

TECHNICAL FIELD

This disclosure relates to maintaining electric power delivery system protection even during control power failures. More particularly, this disclosure relates to a reliable power module for providing operational power to protection devices and other critical equipment of an electric power system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are widely used to generate, transmit, and distribute electric power to loads, and serve as an important part of the critical infrastructure. Power systems and components are often monitored and protected by intelligent electronic devices (IEDs) and systems of IEDs that obtain electric power system information from the equipment and provide protective actions, monitor, and automate the power system. Several IEDs may be in communication to facilitate sharing of information for station-wide, area-wide, or even system-wide protection.

Due to the critical nature of electric power systems, it is very important that electric power systems maintain protection of the equipment even during when operational power (also known as control power or station auxiliary power) to the IEDs is unavailable. In many ways, operational power may be a single point of failure. Operational power can be interrupted or lost completely because of direct-current (DC) faults, battery charger failures, testing, and maintenance incidents. Any interruption, even as short as 100 ms can cause devices to restart. Restarts cause a loss of availability of protection. Accordingly, what is needed are systems and devices to provide reliable operational power to protective devices. Disclosed herein are embodiments of a reliable power module to maintain power supply to primary protection relays even when operational power may be interrupted, lost, otherwise unavailable.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Figure 1:
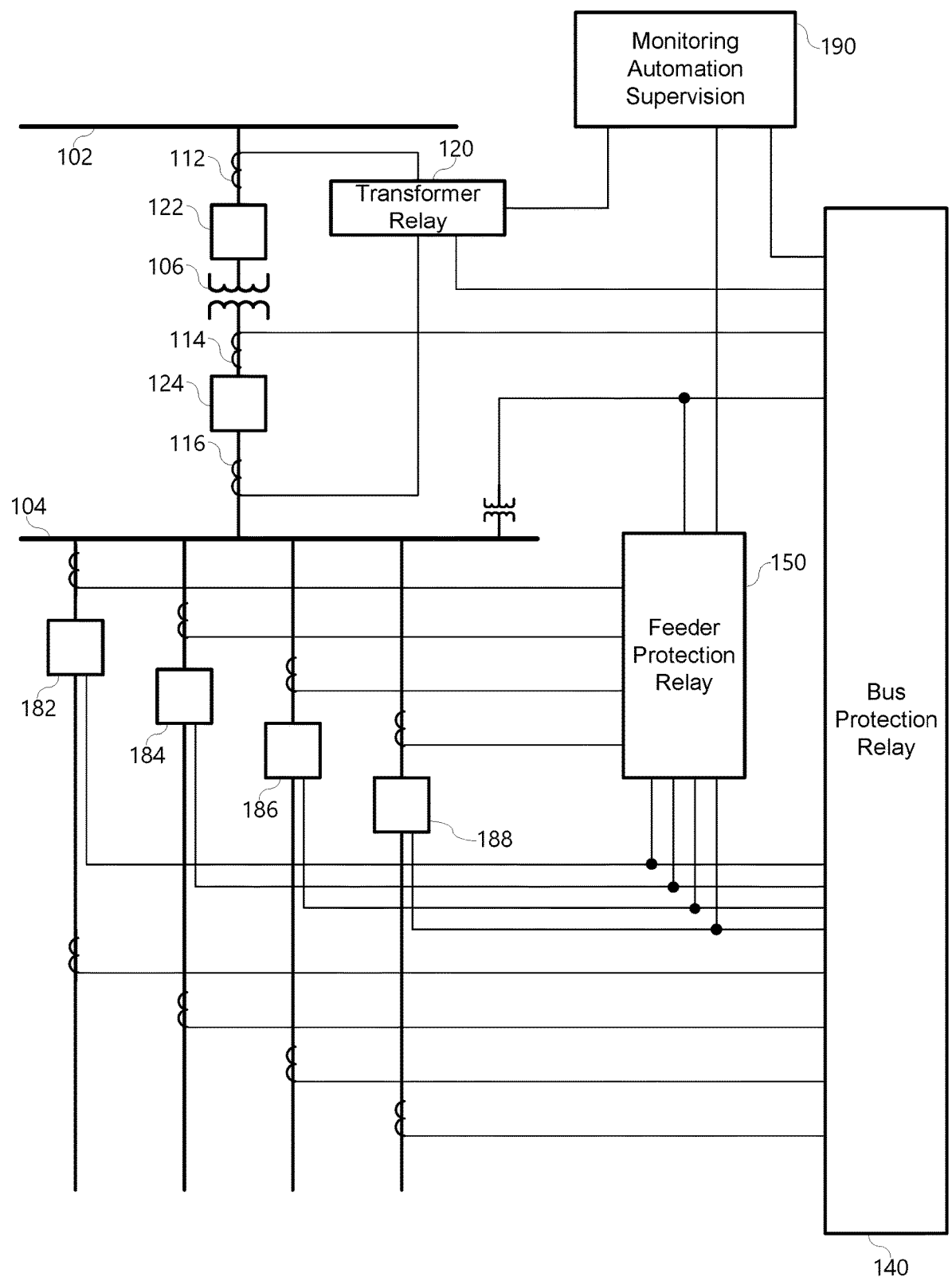
FIG. 1 illustrates a simplified one-line diagram of an electric power delivery system for providing electric power to loads including a system for protection and automation.

FIG. 1 illustrates a simplified one-line diagram of an electric power delivery system. It should be noted that the system may include multiple phases and additional equipment and complexity. Also illustrated is a system of IEDs that obtain electric power system information from electric power system equipment, and effect control actions on the electric power system to provide protection and automation to the electric power delivery system. The power system includes various equipment such as a bus 102 (illustrated as a transmission bus) providing electric power to a second bus 104 (illustrated as a distribution bus) via a transformer 106 for stepping down the power from a high (transmission) voltage to a lower (distribution) voltage. Various feeders extend from the second bus 104 for delivering electric power to distributed loads. Circuit breakers 122, 124, 182, 184, 186, 188 may be used to selectively connect and disconnect portions of the power system for various purposes such as reconfiguration, protection in the event of a fault, or the like.

A bus protection relay 140 may be an IED configured to determine operating conditions on a zone that includes the second bus 104 and provide signals to effect a protection operation upon determination of an adverse condition. IED 140 may obtain current and/or voltage signals related to electric power entering and leaving the bus 104 from various equipment such as instrument transformers. IED 140 may be configured to provide differential protection, overvoltage protection, and various other protection for zone including the bus 104.

Feeder protection relay may be an IED 150 that obtains bus current and/or voltage signals from various instrument transformers in electrical communication with the feeders. IED 150 may provide overcurrent, directional, distance, overfrequency, underfrequency, and other protection to the feeders.

Transformer relay may be an IED 120 configured to provide protection to the transformer 106. IED 120 may obtain current signals from both sides of the transformer 106 from CTs 112 and 116. IED 120 may further provide information to IED 140. IED 120 may be configured to provide differential protection overcurrent protection, over frequency protection, underfrequency protection, and other various protection for the transformer 106.

IEDs 120, 140, 150 may be in communication either directly or indirectly with various circuit breakers 122, 124, 182, 184, 186, 188. The circuit breakers may be configurable between open and closed positions, and may open upon command from the IEDs. Accordingly, the IEDs 120, 140, 150 may be configured to provide protection to the electric power delivery system by commanding the appropriate circuit breaker to open upon detection of an abnormal operating condition on the electric power system. Open commands may be given directly or indirectly. Open signals may be provided by closing a contact to provide the electrical power to the circuit breaker to open.

In various embodiments, the IEDs may be in communication with a monitoring, automation, or other supervisory system or device 190, such as a SCADA system.

Figure 2:
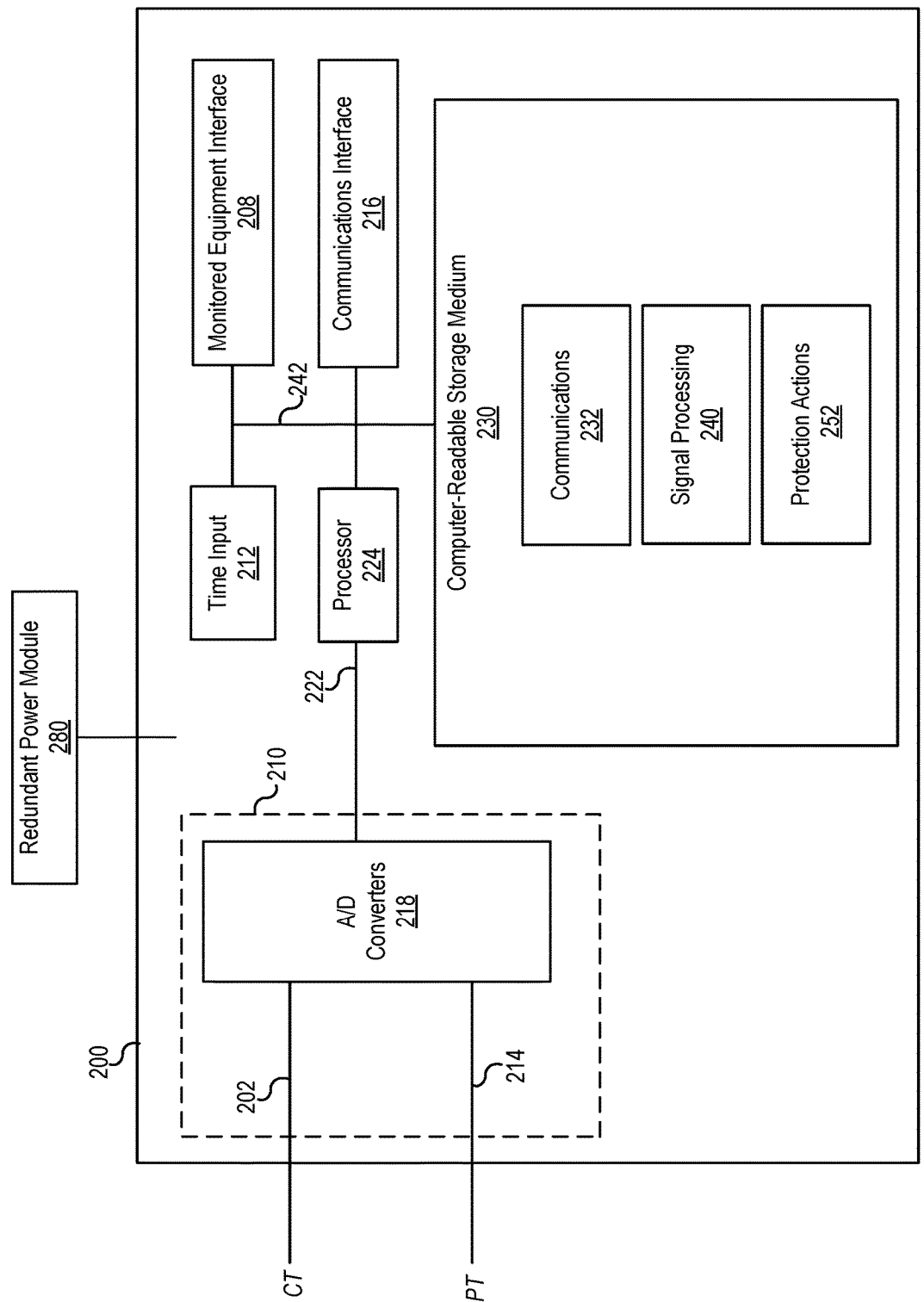
FIG. 2 illustrates a simplified block diagram of an intelligent electronic device (IED) used for electric power system protection.

FIG. 2 illustrates a simplified block diagram of an IED 200 such as the transformer relay 120, bus protection relay 140, or feeder protection relay 150. The IED 200 receives power system information such as currents and/or voltages from the power system. As illustrated, the IED 200 obtains analog current and voltage signals from CTs and PTs. In other embodiments, IED 200 may receive digitized analog signals from MUs. IED 200 may include sampling circuitry 210 including current input 202 and voltage input 214. Such inputs 202, 214 may include various transformers, filters, and other hardware to condition the analog signals for sampling and digitizing by one or more analog-to-digital converters A/D 218. The digitized analog signals 222 may be provided to a processor 224.

IED 200 may include various inputs and interfaces such as a time input 212 to obtain a common time signal from a common time source. The common time signal may be used in various protection and monitoring functions. A communications interface 216 may be provided to facilitate communications with SCADA, other IEDs, MUs, or the like. A monitored equipment interface 208 may be in communication with monitored equipment such as circuit breakers, transformers, capacitor banks, voltage regulators, reclosers, MUs, or the like to send command signals to the equipment and/or receive status information from the equipment. A computer readable storage medium 230 may be a repository of computer instructions for execution on the processor 224. Although illustrated as a separate component, the storage medium 230 may be packaged with the processor 224. In various other embodiments, the processor may be embodied as a dedicated processing device such as a field-programmable gate array (FPGA) operating various protection instructions. Various components may be in communication via a communications bus 242.

The computer-readable storage medium 230 may include instructions for execution of various operations of the IED. For example, a module of communications instructions 232 may be executed by the processor such that the IED 200 performs communication functions with other devices. The communications instructions 232 may include instructions for formatting communications, receiving communications, addresses for communicating, settings related to compliance with various communication protocols such as, for example, DNP, DNP3, IEC 61850 communications standards, and the like. Signal processing instructions 240 may include instructions for processing current, voltage, and other signals for use by other protection and monitoring functions. For example, signal processing 240 may include various digital filters, resampling, and the like. Protection actions instructions 252 may include instructions for performing various protection functions such as overcurrent, differential, directional, distance, undervoltage, voltage regulation, bus protection, overfrequency, underfrequency, traveling wave, and other protection operations.

IED 200 may include several components that require electric power to operate. Typical IEDs include an internal power supply that receives electric power from a source, and condition the power for use by components of the IED. The power source may be a substation battery (DC), utility power, or the like. In the event that the power supply to the IED is disrupted, the IED may cease to operate, thus leaving the electric power system vulnerable and without protection. Furthermore, even if the disruption is momentary, the IEDs that experienced the disruption would typically require time to start up before they are ready to protect the power system. Accordingly, what is needed is an improved power module to provide operational power to IEDs in a more reliable manner. What is further needed is a power module to provide operational power to IEDs even during a disruption in order to ride through the disruption.

What is presented herein is a redundant power module 280 in electrical communication with one or more IEDs 200 to condition and provide reliable electric power thereto. The redundant power module 280 disclosed herein are further configured to provide electric power even in the event of electric power disruption. Accordingly, the embodiments disclosed herein include power modules that receive electric power from multiple sources and condition the electric power for use by IEDs. Furthermore, several embodiments herein include power storage to continuously provide electric power to IEDs even when all power sources to the power module are disrupted.

Figure 3:
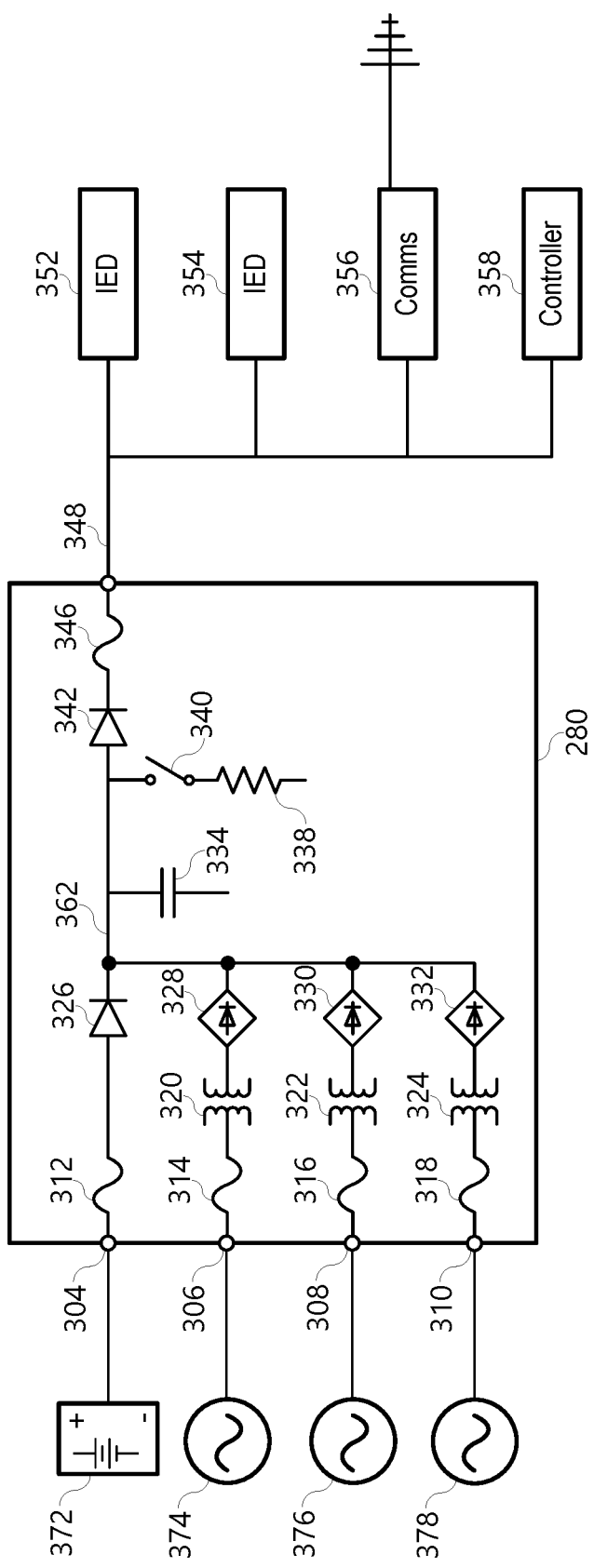
FIG. 3 illustrates a simplified block diagram of a reliable power module and various inputs and outputs in accordance with several embodiments.

FIG. 3 illustrates a redundant power module 280 for providing operational power to the various IEDs. The redundant power module 280 provides a simple novel way to increase the reliability of power supply to critical substation equipment such as protective relays as described above, and other devices that use electric power such as, for example, automation controllers, SCADA equipment, communication devices, and the like. The redundant power module 280 includes various inputs 304, 306, 308, 310 for receiving multiple sources of electric power. For example, a first input 304 may be configured to receive DC power from a DC power source 372 such as a substation battery or the like. The redundant power module 280 may include multiple AC inputs 306, 308, 310 each configured to receive AC power from AC power sources 374, 376, and 378. The AC inputs may be independent. The redundant power module 280 may be configured to condition and deliver power when any one or more sources provide sufficient electric power to the redundant power module 280.

To produce a highly reliable and available conditioned DC output 348, the redundant power module 280 may include circuitry for conditioning electric power, and may include elements for storing electric power. Each input 304-310 includes a protective element such as a fuse 312, 314, 316, 318 designed to cut off power from a particular source in the event that a current level of that power source exceeds a safe operating margin. In general, the power obtained over inputs 304-310 is passed through conditioning circuitry that may include a rectification system to produce the DC output. Power from the DC source 372 may pass through the passive conditioning circuitry that includes diode circuit 326 to ensure proper polarity. Thus, the conditioning circuitry for the DC source 372 provides direct current conditioned power 362 for powering the protective loads 352, 354, 356, 358.

Power from the AC sources 374, 376, 378 must be conditioned by conditioning circuitry to provide the direct current conditioned power 362. The conditioning circuitry may include transformation and rectification to produce the desired DC power on output 348. Power from each AC source 374, 376, 378 may pass through transformers 320, 322, 324 to transform the source current to an expected level and provide isolation. Power from the transformers 320, 322, 324 may be rectified using rectifier circuits 328, 330, and 332. Rectifier circuits may include any circuitry useful for rectifying an AC power source into DC power supply. Rectifier circuits 328, 330, 332 may be implemented as simple diodes, providing half-wave rectified DC power. Rectifier circuits 328, 330, 332 may include diode bridges to provide full wave rectified DC power. Rectifier circuits 328, 330, 332 may include additional circuitry to smooth and otherwise condition the DC output from each source to be within expected margins.

Figure 8:
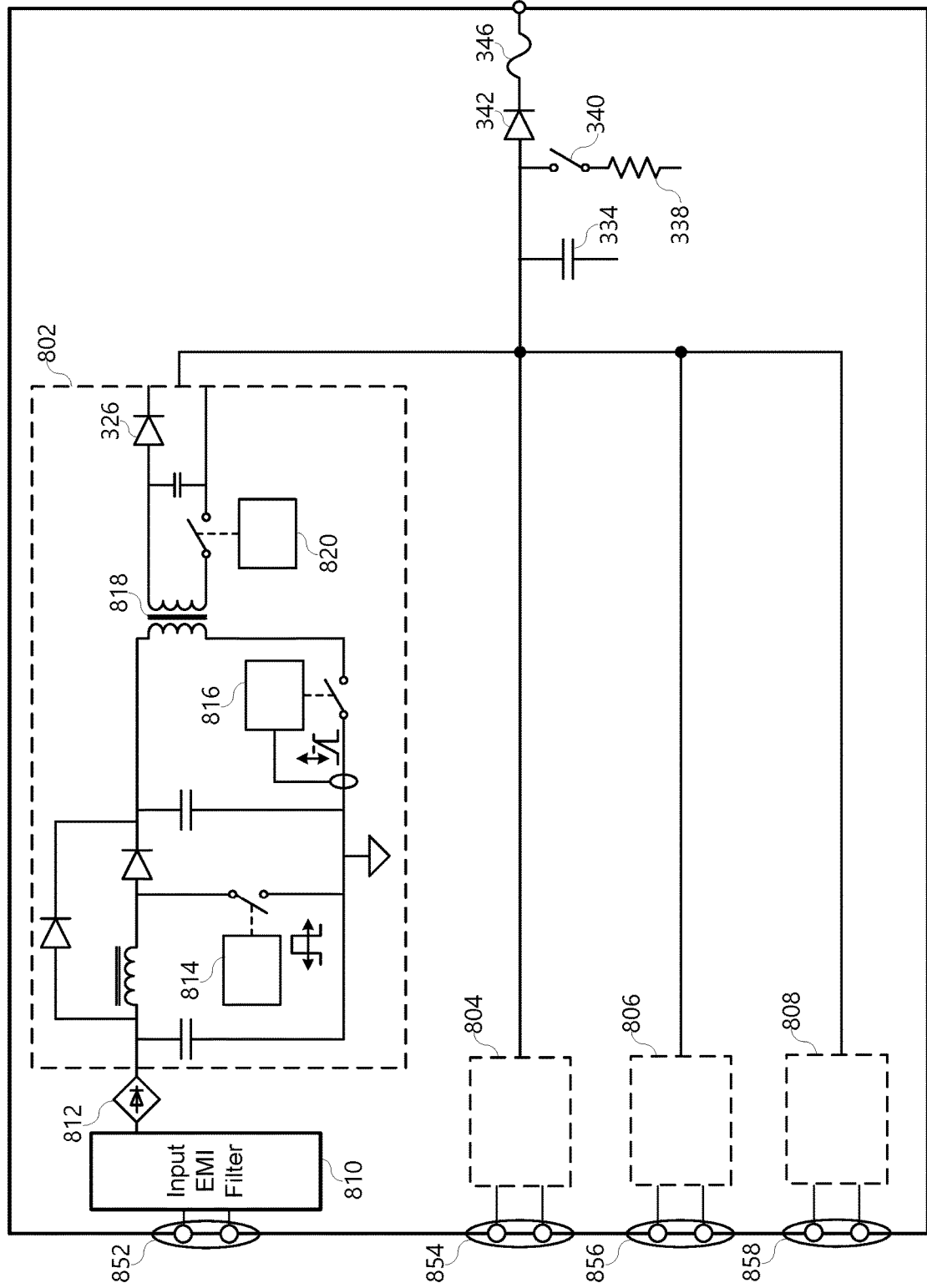
FIG. 8 illustrates a simplified block diagram of active circuitry for power conversion.

Although the rectifier circuitry illustrated in FIG. 3 represents passive circuitry, the redundant power module may include active circuitry for converting the input source power into the expected output power for consuming devices. FIG. 8 (discussed hereafter) discloses active circuitry for power conversion.

In various embodiments AC sources 374, 376, and 378 may be three-phase sources with each source from a separate phase. In such embodiments, the rectifier circuitry 328, 330, 332 may include a three-phase diode bridge for three-phase full-wave rectification of the three-phase input power.

In various embodiments, one or more of the AC sources 374, 376, and/or 378 may include electric power provided parasitically from the electric power delivery system. For example, a current transformer in electrical communication with a phase conductor of an AC electric power system may be used as an AC power source for the redundant power module 280. The AC sources may obtain power using substation potential transformers, station auxiliary transformers, backup generators, or any combination.

The rectified power from each of the sources are then passed through diode 342, and output protection fuse 346. The diode 342 may protect against reverse biasing the output, thus providing additional safety. The DC output 348 is then provided to various consuming devices such as, for example, IED 352, IED 354, communication device 356 and controller 358. Although certain consuming devices are illustrated, any device that may consume DC power may benefit from the output 348. In various embodiments, the redundant power module 280 may output power for tripping circuit breakers, with the output 348 in electrical communication with a trip circuit. As such, power for tripping circuit breakers may be available even when control power is otherwise disrupted.

The redundant power module 280 may include one or more power storage devices 334 such as capacitor for storage of electric power and delivery of the stored electric power to the output 348 in the event that all of the power sources 372-378 to the redundant power module 280 are disrupted. The power storage device 334 may be configured to store sufficient electric power to ride through expected disruptions.

In one embodiment, the power storage device 334 is a capacitive element such as a capacitor or capacitor bank. The capacitive element may be configured to store around 1500 watt-seconds nominal of energy. The capacitive element may store sufficient power to support a 25-watt load for 60 seconds. The capacitive element may be rated at around ⅛ farad (F). The power storage device 334 may further include a discharge switch 340 in electrical communication with a terminal of the capacitive element 334 for selectively discharging electric power stored in the capacitive element 334 through resistor 338. The discharge switch 340 may be considered as a safety mechanism due to the large amount of energy that may be stored in the capacitive element 334.

Figure 4:
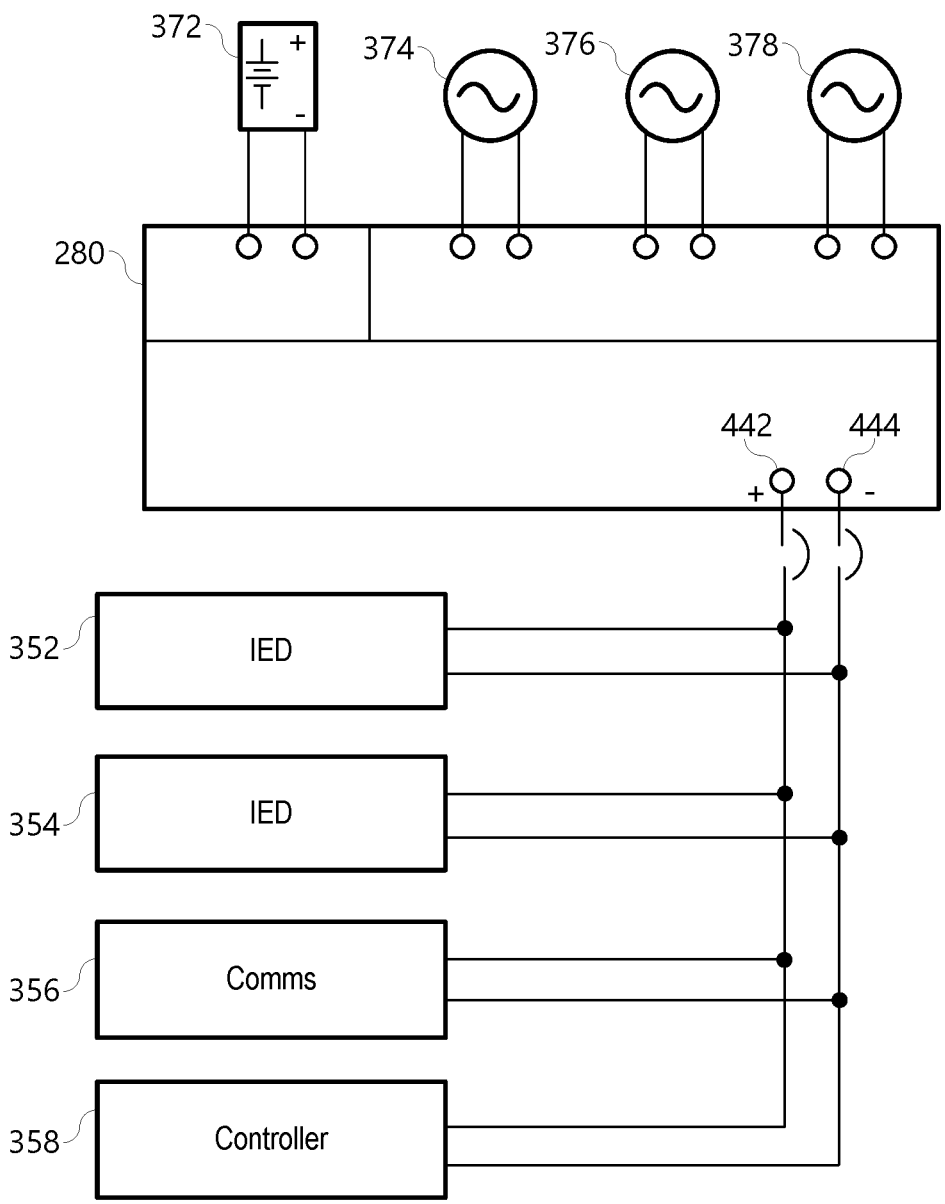
FIG. 4 illustrates a simplified block diagram of a reliable power module providing operational power to various devices in parallel.

FIG. 4 illustrates a simplified block diagram of one system that includes a reliable power module 280 for providing operational power to devices. The reliable power module 280 receives electric power from multiple control power sources including three AC power sources 374, 376, 378, and a DC power source 372. The reliable power module 280 includes a DC output with a positive pole 442 and a negative pole 444. The DC output may be protected by one or more fuses. Multiple devices 352, 354, 356, 358 may be connected in parallel from the single DC output (poles 442, 444).

In the illustrated embodiment, the reliable power module 280 continues to provide operational power to each of the devices unless all of the AC and DC power sources are lost. Even in the event that all AC and DC power sources are lost, the reliable power module 280 continues to provide operational power to the devices until the power storage is expired.

One important function of protective relays is to signal circuit breakers to trip in accordance with the operational logic of the protective relay. Tripping the breaker is necessary to remove electric power from the affected portion of the electric power delivery system. However, tripping a breaker requires operational power. In the event that operational power is lost, the ability of protective devices to trip a breaker may also be lost. Accordingly, the reliable power module 280 of various embodiments described herein may be used to provide operational power to protective devices and to provide operational power to trip coils in order to trip a circuit breaker. It should be noted that the reliable power module in accordance with several embodiments herein is capable of storing around 1500 watt-seconds nominal of electric power. Trip coils typically require less than around 60 watt-seconds to operate. Accordingly, the reliable power module may be used to provide electric power to protective devices and to operate trip coils even in the event that all power sources to the reliable power module are lost.

Figure 5:
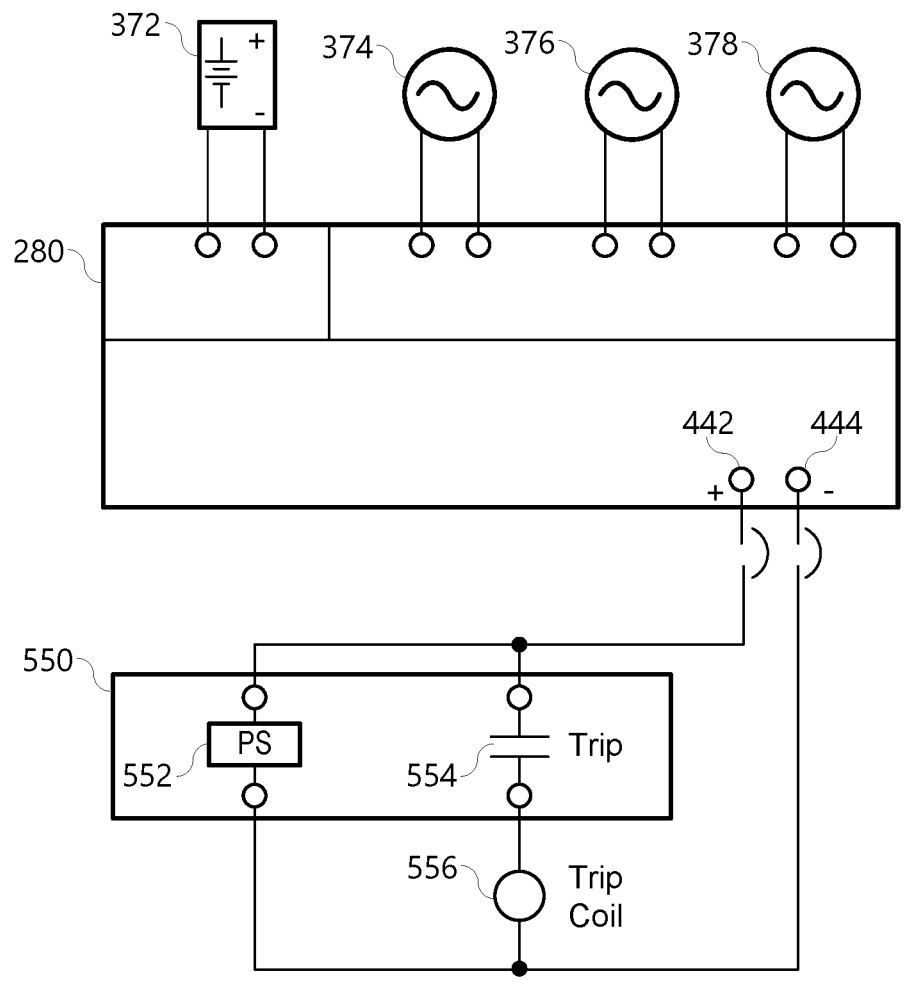
FIG. 5 illustrates a simplified block diagram of a reliable power module providing tripping current to a trip coil.

FIG. 5 illustrates a simplified block diagram of a reliable power module 280 for providing electric power to a protection device 550 and a trip coil 556 in parallel. The protection device 550 may include a power supply 552 in electrical communication with the positive and negative poles 442, 444 of the DC output, and configured to provide electric power to the various modules of the protection device 550. One pole (illustrated is the positive pole 442) may be in electrical communication with the trip contact 554 of the protection device 550. The trip contact may be in electrical communication with the trip coil 556, which is also in electrical communication with the other pole (illustrated is the negative pole 444), such that upon closing of the trip contact 554 by the protection device 550 the trip coil 556 is energized, causing the circuit breaker (not illustrated) to trip open to remove electric power from a portion of the electric power delivery system.

Accordingly, the reliable power module 280 provides operational power to the protection relay and trip coil in parallel. Even in the event of disruption of all power sources 372, 374, 376, 378, operational power continues to be provided to the protection relay 550 and trip coil 556 such that protection to the electric power system is maintained.

Figure 6:
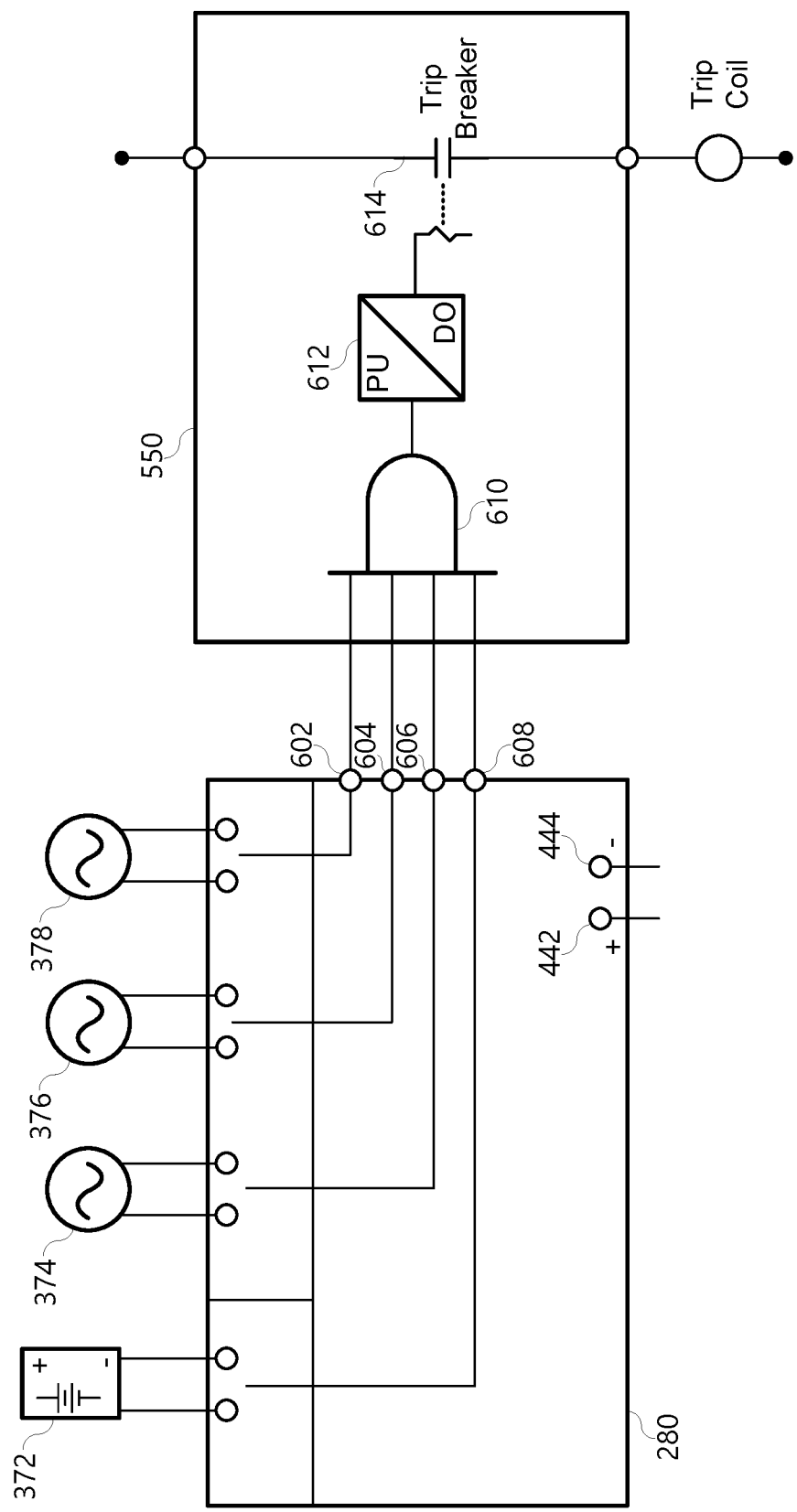
FIG. 6 illustrates a logical diagram for tripping a breaker in the event of a loss of all power sources to a reliable power module.

In various embodiments, it may be desirable to simply trip all breakers in the event that protection is lost. That is, a system may be designed such that in the event that all sources of operational power are lost, circuit breakers are automatically tripped so that the electric power delivery system does not remain operational when unprotected. FIG. 6 illustrates a logic diagram useful for such action. In accordance with several embodiments herein, the reliable power module 280 may include alarm contact outputs 602, 604, 606, 608. The alarm contact outputs 602-608 may each be in communication with the individual power sources 372, 374, 376, 378. The alarm contact outputs 602-608 may be configured to assert upon loss of the related power source. That is, output 602 asserts upon loss of AC power source 378; output 604 asserts upon loss of AC power source 376; output 606 asserts upon los of AC power source 374; and, output 608 asserts upon loss of DC power source 372.

The outputs 602-608 may be in communication with a protection device 550 capable of signaling one or more circuit breakers to trip. Each of the outputs 602-608 may signal an AND gate 610. Upon assertion of each of the output signals 602-608, indicating interruption of all of the power sources 372-378, the AND gate asserts to timer 612. The timer 612 may pickup after a predetermined delay time. The delay time may be set long enough to provide security over temporary interruptions. The delay time may be set according to the time that the reliable power module 280 is capable of providing operational power in the event of loss of all power sources. Upon satisfaction of the pickup time, the timer 612 asserts to the trip contact 614. Upon assertion of the trip contact in response to the assertion from timer 612, current is allowed to flow to the trip coil(s) to trip one or more breakers. The power to the trip coil may be provided by the reliable power module 280 or another reliable power module, or other available power source.

In various systems, multiple reliable power modules may be used to increase availability of operational power and amount of ride through time. In various systems, there may be more power sources available than power inputs to a single reliable power module. In various embodiments, it may be desired to increase the amount of power available during an interruption to the power sources. In such systems, multiple reliable power modules may be used to take advantage of the various power sources and/or to provide additional operational power in the event that the power sources are lost.

Figure 7:
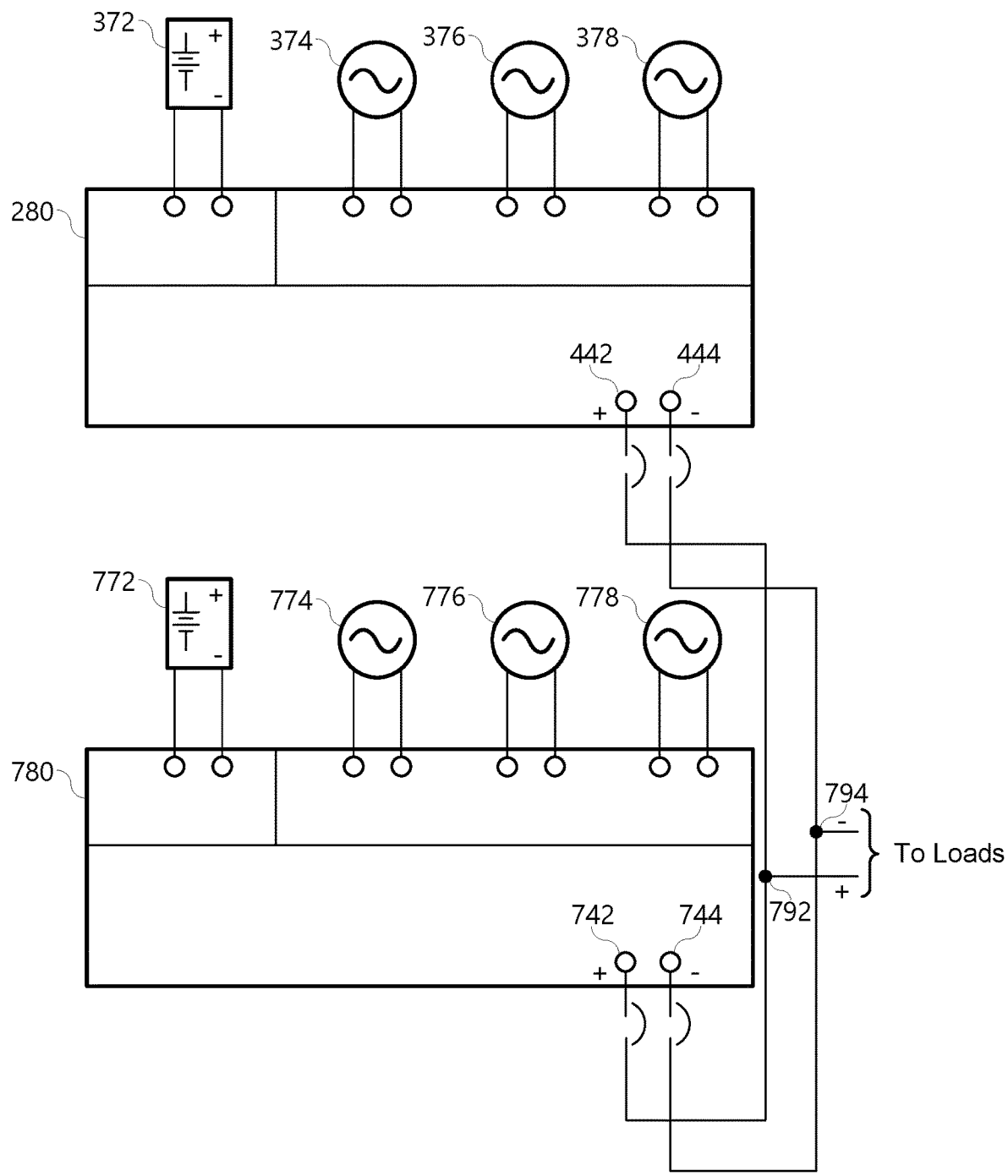
FIG. 7 illustrates a simplified block diagram of a pair of reliable power modules providing operational power in parallel.

FIG. 7 illustrates one embodiment of reliable power modules in parallel to provide reliable operational power. The illustrated system includes a first reliable power module 280 and a second reliable power module 780. The reliable power modules may operate in accordance with the several embodiments described herein. the reliable power modules 280, 780 may receive power from multiple AC and/or DC power sources 372, 374, 376, 378, 772, 774, 776, 778. Although separate AC and DC power sources are illustrated, it should be noted that any of the power sources may be common to both of the reliable power modules 280, 780. For example, AC power sources 378 and 778 may be the same power source such as a utility AC power source at a substation. In various other embodiments, all of the power sources 372-378 and 772-778 may be different power sources, and may or may not be independent of each other. For example, AC power of one phase may be a different control power input than the AC power of another phase of the same three-phase power system.

The DC power outputs of the reliable power modules 280, 780 may be configured in parallel to provide electric power to various devices. For example, the positive DC outputs 442, 742 may be in electrical communication to provide a positive DC node 792; and the negative DC outputs 444, 744 may be in electrical communication to provide a common negative DC node 794. The positive and negative nodes 792, 794 may be used to provide the operational power to the loads. The loads may be configured in parallel such as is illustrated in FIG. 4 from the common positive and negative DC nodes.

FIG. 8 illustrates a reliable power module 880 that includes active circuitry for conditioning input power for delivery to the consuming devices. As with various embodiments described above, the reliable power module 880 may include various power inputs such as 852, 854, 856, 858, which may be in electrical contact with various electric power sources. The power sources may be AC power source or DC power sources. The reliable power module 880 may be configured to condition the input AC and/or DC power to DC power within acceptable parameters.

In the illustrated embodiment, one power source may be in electrical connection with input 852. The power source may be an AC or a DC power source. The power source is filtered by, for example, an input electrical magnetic interference (EMI) filter 810. The filter 810 may be conditioned to decrease the amount of EMI that results from active or switched-mode power conditioning. The output of the filter 810 may be rectified to DC by rectifier 812. Electric power from the rectifier at a first voltage may be conditioned using a switching converter 802 to provide an output DC power within predetermined voltage and power ratings. The switching converter 802 may be any switching converter such as, for example, buck, boost, buck-boost, SEPIC, flyback, forward, or combinations thereof.

The illustrated switching converter 802 includes a boost pre-converter and a flyback converter at the power stage. The boost pre-converter includes a diode in parallel with a series inductor and diode, combined with a controlled switch (such as a metal-oxide-semiconductor field-effect transistor (MOSFET) controlled by a mode controller 814, as illustrated. The flyback converter portion may include a controlled switch (such as a MOSFET controlled by a mode controller 816). A transformer 818 may be used for isolation and for converting the voltage to the acceptable output level. Another controlled switch 820 may be used along with a capacitor and diode 326 to condition the output power and protect against reverse biasing. The output of the switching converter 802 may be combined (in OR fashion) with outputs of additional power conditioning circuitry such that conditioned power from any of the connected power source may provide output operational power from the reliable power module 880.

Further inputs 854, 856, 858 may be in electrical connection with one or more additional power supplies. The power supplies may be AC and/or DC. Each of the inputs 854, 856, 858 may provide the power to conditioning circuitry 804, 806, 808. In various embodiments, each of the power conditioning circuitry 804, 806, 808 include active converters such as the switching converter 802. In various other embodiments, one or more of the power conditioning circuitry 804, 806, 808 are active converters such as the switching converter 802, and the remaining power condition circuitry include inactive components such as is illustrated and described in conjunction with FIG. 3. In various embodiments, the power conditioning circuitry in communication with DC power inputs include active circuitry such as the switching circuitry 802, and the power conditioning circuitry in communication with AC power inputs include inactive circuitry such as is illustrated and described in conjunction with FIG. 3. Filters and rectifiers (such as filter 810 and rectifier 812) may also be included with conditioning circuitry on one or more of the power inputs 852, 854, 856, 858 for AC and/or DC power sources.

In accordance with the various embodiments described herein, the reliable power modules may be used to provide operational power to one or more loads such as protection devices, communication devices, computers, trip coils, and the like. The operational power may be provided even in the event of loss of all power sources for a ride-through time. The operational power may be provided in order to allow for disconnection of certain power sources. For example, when maintenance needs to be performed on a DC power source, the AC power sources continue to provide power to the reliable power module (which continues to provide operational power to the loads), allowing the DC power source to be removed during the maintenance. AC power sources may parasitically obtained from the AC power of the electric power delivery system. Each AC power source may be a different phase of a three-phase electric power delivery system. Thus, all AC power is only lost in the event of a three-phase fault on the electric power delivery system. The ride-through power of the reliable power module(s) may be sufficient for a backup generator to start up and energize inputs to the reliable power module(s). Electric power output from a backup generator may be an input to one or more reliable power modules.

Various modifications and changes may be made to the various embodiments herein. For example, various embodiments of the reliable power modules described herein may include more or fewer or different power source inputs. A reliable power module may include multiple DC inputs and/or multiple AC inputs. In another example, the output of the reliable power modules may be rated at a level different from what is described above. For example, the output may be a 48V DC output. In other embodiments, the output may be a 125V DC output. The output may be capable of, for example, 100 W, continuous while any power source is available to the reliable power module, and during use of the power storage of the reliable power module.

The reliable power modules in accordance herewith solves important electric power system problems. The reliable power modules may improve the reliability of various systems such as a system for control and protection of an electric power delivery system. This is accomplished by feeding a DC output bus of the reliable power module with four different sources such as, for example, one DC, and three AC sources. This allows multiple sources to fail and the output bus of the reliable power module to still be energized. In the event of loss of all input sources, the reliable power module includes a power storage such as a capacitor or capacitor bank that can power devices for second to minutes depending on starting voltage and drop out voltage). This device is designed to be maintenance free and alarm when it fails, or a source is lost.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system for maintaining electric power delivery system protection during unavailability of control power, comprising:
   an electric power delivery system protective load;
   a first direct current power source;
   a first alternating current power source, independent from the first direct current power source;
   a power supply module in electrical communication with the first direct current power source and the first alternating current power source, comprising:
      a first power conditioning circuit in communication with the first alternating current power source to rectify power from the first alternating current power source to a direct current conditioned power;
      a second power conditioning circuit in electrical communication with the first direct current power source to condition power from the first direct current power source to the direct current conditioned power;
      a storage device in electrical communication with the direct current conditioned power for storing power in the presence of the direct current conditioned power and releasing power upon failure of the direct current conditioned power; and
      a power output in electrical communication with the first power conditioning circuit, the second power conditioning circuit, and the storage device to receive the direct current conditioned power from any of the first power conditioning circuit, the second power conditioning circuit, and the storage device and provide the direct current conditioned power to the electric power delivery system protective load.

2. The system of claim 1, wherein the power output is configured to provide the direct current conditioned power to the electric power delivery system protective load during interruption of any selected from the group consisting of the first direct current power source, the second direct current power source, and combinations thereof.

3. The system of claim 1, wherein the electric power delivery system protective load comprises a protective relay.

4. The system of claim 1, wherein the electric power delivery system protective load comprises a trip coil.

5. The system of claim 1, wherein the storage device comprises capacitive storage.

6. The system of claim 5, wherein the storage device comprises sufficient capacity to energize a trip coil.

7. The system of claim 5, wherein the storage device comprises sufficient capacity to power the electric power delivery system protective load for a time required to start backup generation.

8. The system of claim 1, wherein the electric power delivery system protective load comprises a trip circuit for tripping a circuit breaker upon loss of both the first direct current power supply and first alternating current power supply.

9. The system of claim 1, further comprising a second power supply module with a power output providing electric power to the electric power delivery system protective load in parallel with the power output.

10. The system of claim 1, wherein one of the first and second power conditioning circuits comprises an active power conditioning circuit, and another of the first and second power conditioning circuits comprise a passive power conditioning circuit.

11. The system of claim 1, wherein both of the first and second power conditioning circuits comprise passive power conditioning circuits.

12. A power supply module for maintaining electric power delivery system protection during unavailability of control power, comprising:
- a first control power input in communication with a first control power source;
- a second control power input in communication with a second control power source independent of the first control power source;
- a first power conditioning circuit in communication with the first control power input to condition electric power to a direct current conditioned power;
- a second power conditioning circuit in communication with the second power input to condition electric power to the direct current conditioned power, an output of the second power conditioning circuit in electrical communication with an output of the first power conditioning circuit;
- a storage device in electrical communication with the first and second power conditioning circuits for storing power in the presence of the direct current conditioned power from any of the first and second power conditioning circuits, and releasing power upon failure of the direct current conditioned power from both of the first and second power conditioning circuits; and,
- a power output in electrical communication with the first power conditioning circuit, the second power conditioning circuit, and the storage device to receive the direct current conditioned power from any of the first power conditioning circuit, the second power conditioning circuit, and the storage device, and provide the direct current conditioned power to an electric power delivery system protective load.

13. The power supply module of claim 12, wherein the storage device comprises capacitive storage.

14. The power supply module of claim 13, wherein the storage device comprises sufficient capacity to energize a trip coil.

15. The power supply module of claim 13, wherein the storage device comprises sufficient capacity to power the electric power delivery system protective load for a time required to start backup generation.

16. The power supply module of claim 12, wherein the first control power input comprises a direct-current input and the second control power input comprises an alternating-current power input.

17. The power supply module of claim 12, wherein one of the first and second power conditioning circuits comprises an active power conditioning circuit, and another of the first and second power conditioning circuits comprise a passive power conditioning circuit.

18. The power supply module of claim 12, wherein both of the first and second power conditioning circuits comprise passive power conditioning circuits.

19. The power supply module of claim 12, wherein
- the first control power input comprises a direct-current control power input;
- the second control power input comprise an alternating-current control power input;
- the first power conditioning circuit comprises a diode; and
- the second power conditioning circuit comprises a transformer and a rectifier.

20. The power supply module of claim 1, wherein the power output comprises a discharge switch configured to discharge the power storage device upon activation.

* * * * *